United States Patent
Chebiyyam et al.

(10) Patent No.: US 12,515,603 B1
(45) Date of Patent: Jan. 6, 2026

(54) DETECTING VEHICLE IMPACTS BASED ON INTERIOR MICROPHONES

(71) Applicant: Zoox, Inc., Foster City, CA (US)

(72) Inventors: Venkata Subrahmanyam Chandra Sekhar Chebiyyam, Mountain View, CA (US); Shaminda Subasingha, San Ramon, CA (US)

(73) Assignee: Zoox, Inc., Foster City, CA (US)

( * ) Notice: Subject to any disclaimer, the term of this patent is extended or adjusted under 35 U.S.C. 154(b) by 43 days.

(21) Appl. No.: 18/790,463

(22) Filed: Jul. 31, 2024

(51) Int. Cl.
*B60R 21/0136* (2006.01)
*H04R 1/40* (2006.01)
*H04R 3/00* (2006.01)
*B60R 21/013* (2006.01)

(52) U.S. Cl.
CPC ......... *B60R 21/0136* (2013.01); *H04R 1/406* (2013.01); *H04R 3/005* (2013.01); *B60R 2021/01302* (2013.01); *H04R 2499/13* (2013.01)

(58) Field of Classification Search
CPC ...... B60R 21/0136; H04R 1/406; H04R 3/005
See application file for complete search history.

(56) References Cited

U.S. PATENT DOCUMENTS

| | | | |
|---|---|---|---|
| 10,649,459 | B2 | 5/2020 | Wang et al. |
| 10,755,691 | B1 * | 8/2020 | Herman ............ G10K 11/17853 |
| 11,601,542 | B1 * | 3/2023 | Veloso ................. H04M 1/6075 |
| 11,851,049 | B1 | 12/2023 | Bethanabhotla et al. |
| 2017/0021768 | A1 * | 1/2017 | Jaegal ..................... G06F 3/165 |
| 2020/0118418 | A1 * | 4/2020 | Benjamin ............ G08B 25/016 |
| 2020/0238902 | A1 * | 7/2020 | Pyzik ..................... B60Q 5/008 |
| 2021/0173866 | A1 * | 6/2021 | McFarland, Jr. ..... G06F 16/638 |
| 2021/0174674 | A1 * | 6/2021 | McFarland, Jr. ....... G10L 25/57 |
| 2021/0335064 | A1 * | 10/2021 | Kim ..................... G07C 5/0808 |
| 2021/0380059 | A1 * | 12/2021 | Jones .................... B60W 50/14 |
| 2023/0062200 | A1 * | 3/2023 | Stenneth ............ G01C 21/3461 |
| 2023/0386268 | A1 * | 11/2023 | Scarbrough ............ H04N 7/183 |
| 2024/0132076 | A1 * | 4/2024 | Sisbot ................. B60W 40/105 |

\* cited by examiner

Primary Examiner — Long T Tran
(74) Attorney, Agent, or Firm — Lee & Hayes, P.C.

(57) ABSTRACT

Techniques for detecting impacts to a vehicle body are described herein. A vehicle may receive first audio data (associated with a sound) from a microphone located inside the vehicle. Further, the vehicle may receive second audio data (associated with the sound) from a microphone that is external to the vehicle. The vehicle can compare, for example, the volumes of the first and second audio to determine a difference. The vehicle can compare the difference to a threshold to determine whether the sound corresponds to an impact to the vehicle body. For example, if the difference is below the threshold (e.g., the volume levels of the first and second audio data are similar), the vehicle can classify the sound as corresponding to an impact to the vehicle. The vehicle can control the vehicle based on the sound being classified as an impact to the vehicle body.

20 Claims, 7 Drawing Sheets

DETECTING VEHICLE IMPACTS BASED ON INTERIOR MICROPHONES

BACKGROUND

Vehicles, such as autonomous vehicles, may navigate along designated routes. In some examples, autonomous vehicles may encounter various types of static and/or dynamic objects within an environment. In some circumstances, the autonomous vehicle may use sensors to detect and/or classify these objects. Further, the sensors may be used to determine whether the object(s) impact or collide with the vehicle. However, in certain circumstances, techniques for detecting impact(s) to the vehicle can be inefficient and/or lead to inaccurate results.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
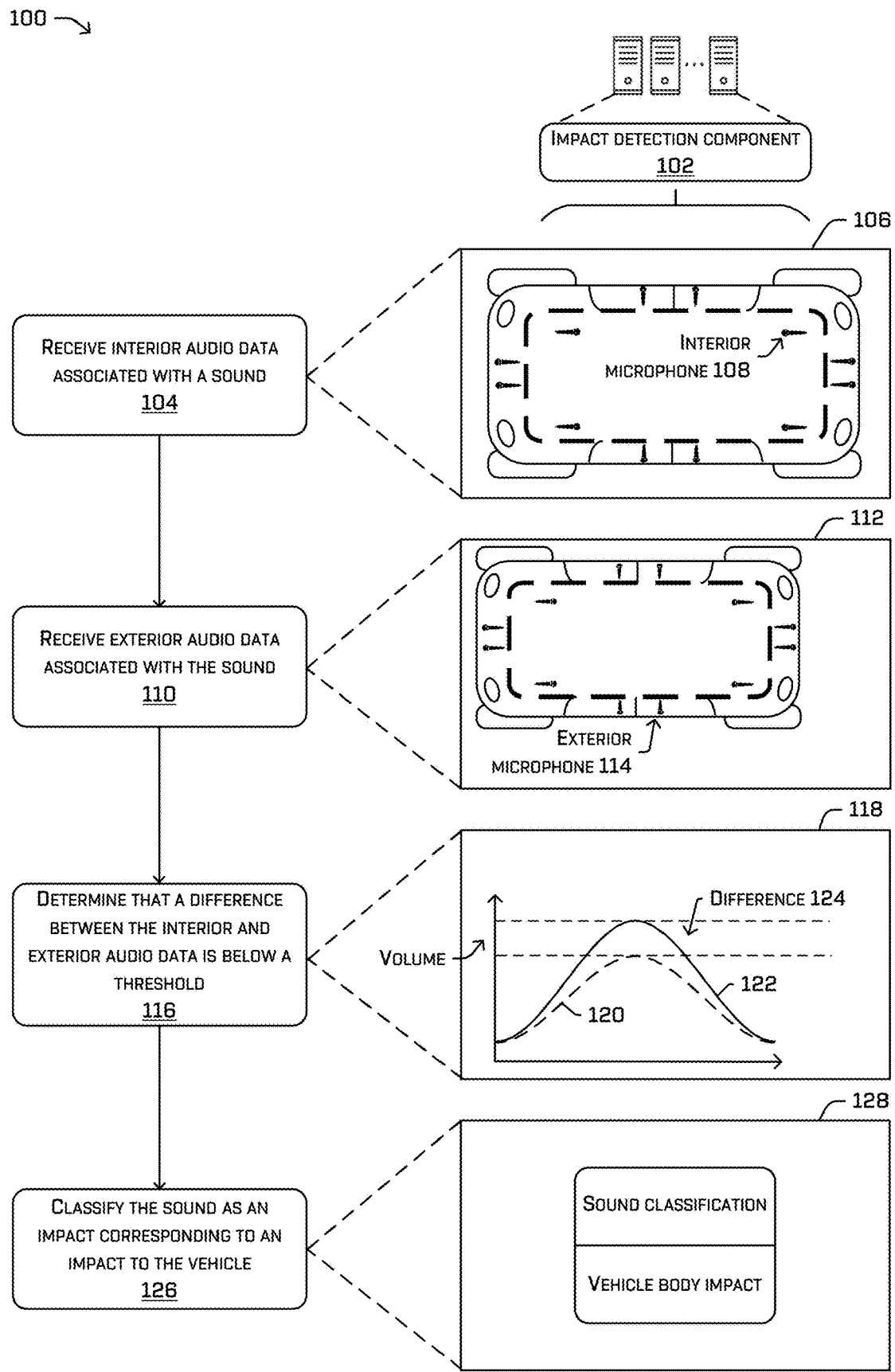
FIG. 1 is a pictorial flow diagram illustrating an example technique for detecting vehicle impacts using interior microphones, in accordance with one or more examples of the disclosure.

Techniques for detecting impacts to a vehicle body are described herein. As discussed below, microphones located throughout a vehicle may be used to detect impacts to the vehicle. In some examples, a vehicle (such as an autonomous vehicle) may receive first audio data (associated with a sound) from a microphone located inside the vehicle. Further, the vehicle may receive second audio data (associated with the sound) from a microphone that is external to the vehicle. In such cases, the vehicle can compare the volume levels of the first and second audio data to determine a difference in volume. The vehicle can compare the difference in volume to a threshold to determine whether the sound corresponds to an impact to the vehicle body. That is, if the volume difference is below the threshold (e.g., the volume levels of the first and second audio data are similar), the vehicle can classify the sound as corresponding to an impact to the vehicle. The vehicle can control the vehicle based on the sound being classified as an impact to the vehicle body. As described in more detail below, the techniques described herein may improve vehicle safety and/or driving efficiency by increasing the ability of the vehicle to detect minor impacts (or collisions) and thereby reducing the number of false-positive impact detections.

When determining whether the vehicle has been impacted (e.g., hit by a shopping cart in a parking lot), conventional techniques may result in inaccurate and/or misidentified detections. For example, the vehicle may navigate an environment proximate one or more static and/or dynamic objects. In some examples, the vehicle may use various sensors, such as microphones located on an external surface of the vehicle to detect if an object impacts (or collides) with the vehicle. However, in some circumstances, the external microphones may misclassify impacts (e.g., false-positive impact) that cause below a threshold level of damage. That is, in some cases, the external microphones may classify sound(s) in the vicinity of the vehicle as sound(s) that correspond to an impact to the vehicle body. For example, the external microphone may detect a sound of a car door being slammed in the vicinity of the vehicle, determine that the sound is similar to an impact, and inaccurately classify the sound as an impact to the vehicle body. In this case, the slammed car door is a false-positive impact detection and is not an impact to the vehicle body. However, in such cases, the vehicle may process the false-positive impact and determine future actions based on the impact. Accordingly, the techniques and/or systems described herein may allow the vehicle to accurately detect vehicle body impacts while reducing the rate of false-positive detections.

To address these and other technical problems and inefficiencies, the systems and/or techniques described herein include an impact detection component (which also may be referred to as an "impact detector" or "impact detection system") configured to leverage interior microphones (alone or in combination with other microphones and/or sensors) to detect impacts to a vehicle body. Technical solutions discussed herein solve one or more technical problems associated with false-positive impact detections of minor vehicle body impacts.

In some examples, the impact detection component may receive first audio data from a microphone located inside the vehicle cabin. That is, one or more microphones located inside the vehicle cabin may receive first audio data associated with a sound. In some examples, the vehicle may include a cabin that defines an interior region of the vehicle. The cabin may include one or more seats upon which one or more passengers may sit while the vehicle navigates the environment. In some examples, the cabin may be sealed from the environment external to the vehicle such as to form a soundproof (or sound resistant) cabin. That is, the sound(s) that occur external to the vehicle cabin (or in the vicinity of the vehicle) may be suppressed and/or at least partially blocked by the vehicle body such that the sound(s) are not heard or are attenuated inside the vehicle cabin.

In some examples, the cabin may include one or more microphones (otherwise known as interior microphones) located, mounted, and/or installed at various positions within the vehicle cabin. For example, the microphone(s) may be located or otherwise positioned along the sides, edges, roof, seats, and/or floor portion of the cabin. Such microphones may be designed to capture audio that is perceptible inside the vehicle cabin. As such, based on the occurrence of a sound, the impact detection component may receive associated audio data from some or all of the interior microphones.

In some examples, the impact detection component may receive second audio data from a microphone located outside the vehicle. That is, the vehicle may include one or more microphones located along an exterior surface of the vehicle body. The external microphone(s) may be located, mounted, and/or installed at various positions (e.g., side, end, top, bottom, etc.) along the external surface of the vehicle body. In some examples, the external microphones may be designed to receive audio associated with sound that is external to the vehicle cabin. Accordingly, based on the occurrence of the sound, the impact detection component may receive associated audio data from some or all of the exterior microphones.

In some examples, the impact detection component may determine a difference (or attribute (e.g., difference, ratio, etc.)) in volume (and/or other characteristics) between the first and second audio data. Based on the soundproof cabin, sound(s) that don't correspond to physical contact to the vehicle body are not likely to be captured by the interior microphones or will be captured at a much lower volume. In contrast, sounds that correspond to physical contact to the vehicle body may propagate through the vehicle body and are likely to be captured by the interior microphones as well as the external microphones. As such, the impact detection component can compare the volume levels of the first and second audio data to determine whether the volume levels are similar. In the case of an impact to the vehicle body, the interior and exterior microphones may capture audio data at a similar volume level. In the case of a non-impact sound proximate the vehicle, the interior microphone(s) may capture the sound at a lower volume level compared to the exterior microphones due to the sound failing to travel through the vehicle body. As such, the impact detection component can determine a difference between the volume level of the first audio data and the second audio data.

In some examples, the impact detection component may determine whether the difference in volume meets or exceeds a threshold volume difference. The threshold may be determined based on log data (e.g., sensor data captured by a one or more microphones interior and/or exterior to a vehicle from a previous time). That is, the impact detection component may use one or more machine learned models to determine a difference in volume levels that is indicative of a collision to the vehicle body. As noted above, if the sound corresponds to an impact to the vehicle body, the interior and exterior microphones should receive audio data with similar (e.g., within a threshold level) volume levels. As such, if the difference between the volume levels is below a threshold level (e.g., the volume levels of the first and second audio data are sufficiently similar), the impact detection component may classify the sound as corresponding to an impact to the vehicle body. In contrast, since the interior microphones are likely not able to capture audio from sounds in the vicinity of the vehicle due to the soundproof cabin, the interior microphones should capture audio data with a lower volume level than the volume level of the audio data captured by the exterior microphones. As such, if the difference between the volume levels meets or exceeds a threshold level (e.g., the volume levels of the first and second audio data are sufficiently different), the impact detection component may classify the sound as corresponding to a non-impact sound.

In some examples, the vehicle may be controlled based on the sound being associated with an impact to the vehicle body. That is, upon detecting a sound that is indicative of an impact to the vehicle, the vehicle can perform one or more operations. Such operations may include sending a request to a remote operation system (e.g., send sensor data (e.g., radar data, lidar data, image data, audio data, etc.) to a remote operation system (or remote operator)), stop the vehicle (e.g., reduce (or modify) the velocity of the vehicle below a threshold amount), record data (e.g., video data, audio data, etc.) associated with the impact (e.g., store features of the data that correspond to the impact), recalibrate some or all systems within the vehicle, etc.

Alternatively or additionally, the impact detection component may detect an impact to the body of the vehicle using solely interior microphones. That is, since the volume of sounds attenuate when such sounds are non-impact sounds, the impact detection component may determine if the volume level of the audio data is sufficiently high. For example, the impact detection component may receive the first audio data from the interior microphone and compare the volume of such audio data to a threshold. If the volume of the first audio data meets or exceeds the threshold (e.g., the audio data is sufficiently loud), the impact detection component may classify the sound as corresponding to an impact to the vehicle body. In contrast, if the volume of the first audio data is below the threshold (e.g., the audio data has a volume lower than what would be expected of a vehicle body impact), the impact detection component may classify the sound as a non-impact sound. In other examples, the impact detection component may perform such operations as additional validation step to ensure that the abovementioned operations are accurate.

Alternatively or additionally, the impact detection component may perform an initial filtering operation prior to determining the difference between the volume levels of the first and second audio data. That is, the impact detection component may use a machine learned model to identify sounds that correspond to vehicle impacts and perform the abovementioned impact detection techniques on the associated audio data. Using the machine learned model may reduce the number of times the impact detection technique is to be performed. For example, the impact detection component may receive audio data from some or all microphones associated with the vehicle. The impact detection component may input the audio data into a machine learned model trained to identify sounds that correspond to an impact to the vehicle body. That is, the machine learned model may be trained on log data that includes sounds being produced from various actions. In such cases, the machine learned model may use the log data to learn to identify sounds that are associated with an impact. As such, the impact detection component may receive, from the machine learned model, an indication regarding whether the audio data corresponds to a vehicle impact. Based on the machine learned model indicating that the audio data corresponds to a vehicle impact, the impact detection component may perform the abovementioned impact detection techniques (e.g., determine difference between interior and exterior audio data, compare difference to threshold, etc.) on such audio data.

Alternatively or additionally, the impact detection component may perform an initial filtering operation prior to determining a difference between the volume levels of the first and second audio data. For example, the impact detection component may receive the audio data associated with a sound and determine that the sound corresponds to a vehicle impact in a certain quadrant (or other defined region) of the vehicle. That is, in some examples, the vehicle may be discretized into four quadrants with each quadrant including one or more microphones. The impact detection component can use one or more machine learned models to determine that the sound corresponds to a vehicle impact. That is, the machine learned model may be trained using log data (or historical data) that corresponds a sound to a quadrant or region of the vehicle. Further, the machine learned model can indicate which quadrant the impact corresponds to. Further, the impact detection component may receive sensor data from a different sensor modality (e.g., radar device, lidar device, image capturing device, etc.) and determine that an action associated with the impact is associated with specific quadrant of the vehicle. As such, the impact detection component may determine whether the quadrants (e.g., from the audio data and from the different modality sensor data) overlap. If the quadrants overlap, the impact detection component may perform the impact detection techniques described above (e.g., determine difference between interior and exterior audio data, compare difference to threshold, etc.). In contrast, if the quadrants do not overlap, the impact detection component may flag the audio data as a candidate false-positive detection. While examples are given in terms of quadrants of the vehicle, in other examples, the vehicle may be discretized into any number of other defined regions or sections.

Additionally or alternatively, the impact detection component may perform an initial filtering operation prior to determining a difference between the volume levels of the first and second audio data. That is, the impact detection component may determine that the audio data corresponds to a vehicle impact in a certain quadrant of the vehicle (e.g., input audio data into a machine learned model trained to identify which quadrant a vehicle body impact occurred in). As such, the impact detection component may identify the microphones that are located within or otherwise associated with the quadrant(s) of the vehicle impact and retrieve the audio data from such microphones. In such cases, the impact detection component may perform the impact detection techniques on the audio data from the microphones located within the quadrant rather than on the audio data from all microphones. Such operations may reduce the amount of audio data to process in the impact detection technique.

Additionally and alternatively, the impact detection component may perform similar operations on a frequency of the audio data, a loudness (e.g., weighted frequency volume) of the audio data, an intensity of the audio data, a time of the audio data, etc. That is, the impact detection component may compare frequencies, loudness, time, and/or intensity of the audio data, determine a difference or ratio, and compare the ratio or the difference to a threshold to determine if the audio data is associated with an impact.

Additionally or alternatively, the impact detection component may perform operations to validate that the sound captured by the internal microphone(s) is the same sound as what is captured by the external microphone(s). In such cases, the upon receiving audio data from the internal microphone(s), the impact detection component may determine whether the sound is a preexisting sound or a generated sound in the cabin of the vehicle (e.g., music being played in the cabin, laughing in the cabin, etc.). In such cases, the impact detection component may determine whether one or more audio settings of the cabin are activated indicative of speakers of the vehicle outputting content. In the case that the speakers are outputting audio, the impact detection component may determine that the volume of the audio data captured by the interior microphones is not associated with an impact to the vehicle body.

The techniques described herein can improve the functioning, safety, and efficiency of the autonomous and semi-autonomous vehicles operating in various driving environments. Using internal microphones can allow the vehicle to reduce the amount of false-positive impact detections. In accurately classifying sounds as impact detections may cause the vehicle to perform suboptimal and/or inefficient maneuvers. Accordingly, detecting minor impacts and minimizing false-positive impacts may result in a healthier vehicle body and/or optimal vehicle maneuvers.

The techniques described herein may be implemented in several ways. Example implementations are provided below with reference to the following figures. Although discussed in the context of an autonomous vehicle, the methods, apparatuses, and systems described herein may be applied to a variety of systems, and are not limited to autonomous vehicles. In another example, the techniques may be utilized in an aviation or nautical context, or in any other system. Additionally, the techniques described herein may be used with real data (e.g., captured using sensor(s)), simulated data (e.g., generated by a simulator), or any combination of the two.

FIG. 1 is a pictorial flow diagram illustrating an example process 100 for detecting vehicle impacts using interior microphones. As shown in this example, some or all of the operations in the example process 100 may be performed by an impact detection component 102, a perception component, prediction component, a planning component, and/or any other component or system within an autonomous vehicle. In some instances, the impact detection component 102 may be associated with one or more of the components described above. As described below in more detail, the impact detection component 102 may include various components, such as a learned filtering component, a volume comparing component, and/or a sound classifying component.

At operation 104, the impact detection component 102 may receive interior audio data associated with a sound. In some examples, a vehicle may include one or more microphones configured to capture audio data associated with a sound. Such microphone(s) may be located inside the vehicle cabin and/or external to the vehicle cabin (e.g., on an external surface of the vehicle body). For example, box 106 illustrates the vehicle with interior microphones. In this example, box 106 may depict the vehicle in a top down perspective. Further, the vehicle may include an interior microphone 108 located inside the vehicle cabin. As shown, the vehicle may include four different internal microphones located at different positions within the vehicle cabin. Of course, in other examples, the vehicle cabin may include more or fewer microphones. In such cases, the impact detection component 102 may receive audio data from the interior microphone 108.

At operation 110, the impact detection component 102 may receive external audio data associated with the sound. In some examples, the vehicle may include one or more microphones located (e.g., installed, mounted, etc.) on an external surface of the vehicle. For example, box 112 illustrates the vehicle with exterior microphones. In this example, box 112 may depict the same or similar vehicle as shown in box 106. Further, the vehicle may include an exterior microphone 114 located on an external surface of the vehicle. That is, the exterior microphone 114 may be located outside of the vehicle cabin. In such cases, the impact detection component 102 may receive audio data from the exterior microphone 114.

At operation 116, the impact detection component 102 may determine that a difference between the interior and exterior audio data is below a threshold. As noted above, the cabin of the vehicle (e.g., interior of the vehicle) may be designed to mitigate and/or suppress the sound occurring outside the vehicle. As such, the sound may be represented with a high volume level in the exterior microphones while being represented with a lower volume level in the interior microphones. However, impact-based sounds may propagate through the vehicle body and may be represented with a similar volume level in both the interior and exterior microphones. Thus, the impact detection component 102 can determine if the difference between the interior audio data and the exterior audio data are sufficiently similar. For example, box 118 illustrates a graph that includes sound waves and that compares the volume levels of the interior and exterior audio data. In this example, the graph may include a waveform 120 that corresponds to the volume level of the interior audio data and a waveform 122 that corresponds to the volume level of the exterior audio data. As shown, the volume level of the exterior audio data may be higher than the volume level of the interior audio data. In this example, the impact detection component 102 may determine the difference 124 between the internal and external audio data which may be represented by the region between the two dashed lines. In this example, the impact detection component 102 can compare the difference 124 to a threshold. The impact detection component 102 can determine whether the difference 124 is below the threshold or whether the difference meets or exceeds the threshold.

At operation 126, the impact detection component 102 may classify the sound as corresponding to an impact to the vehicle. That is, if the difference 124 is below the threshold, the impact detection component 102 can determine that the volume levels are sufficiently similar and that the sound is a vehicle body impact. However, if the difference 124 meets or exceeds the threshold, the impact detection component 102 can determine that the volume levels are distinct and that the sound corresponds to a non-impact action. For example, box 128 illustrates a table that indicates the sounds captured at operation 104 and operation 110 may be classified as a vehicle body impact. In such cases, the impact detection component 102 can slow or stop the vehicle, request remote operation assistance, and/or record data associated with the impact.

Figure 2:
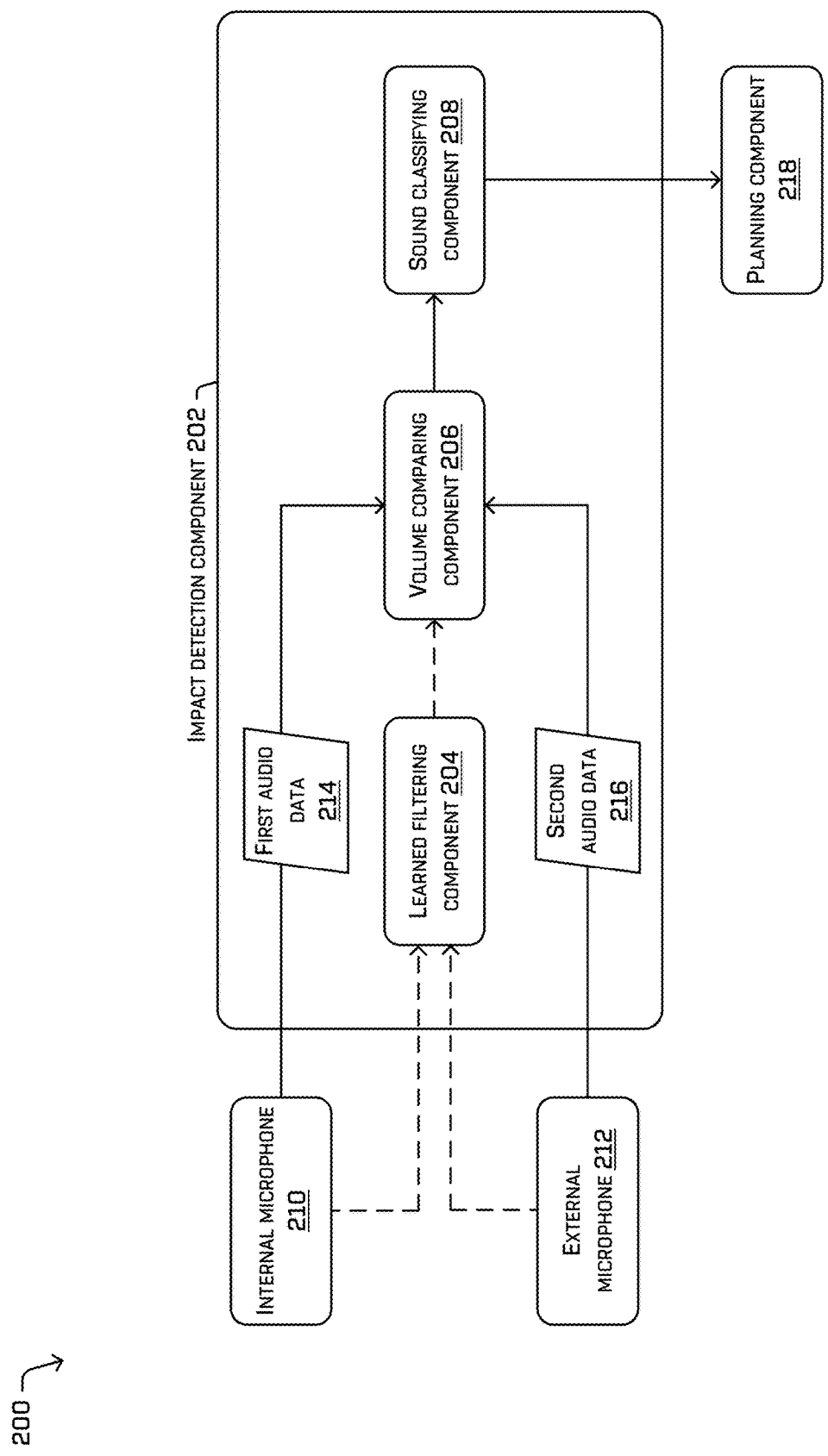
FIG. 2 illustrates an example computing system including an impact detection component configured to detect impacts to a body of a vehicle, in accordance with one or more examples of the disclosure.

FIG. 2 illustrates an example computing system 200 including an impact detection component 202 configured to detect impacts to a body of a vehicle.

In some examples, the impact detection component 202 may be similar or identical to the impact detection component 102 described above, or in any other examples herein. As noted above, in some cases the impact detection component 202 may be implemented within an autonomous vehicle. In some examples, the impact detection component 202 may include various components, described below, configured to perform different functionalities of a technique to detect minor vehicle impact(s). In some examples, the impact detection component 202 may include a learned filtering component 204 configured to identify audio data that corresponds to a vehicle body impact, a volume comparing component 206 configured to determine the difference between volume levels of internal and external audio data, and/or a sound classifying component 208 configured to classify sound as an impact or as a non-impact.

The impact detection component 202 may receive audio data from one or more microphones. As shown, the internal microphone 210 may capture sound and send the associated audio data to the impact detection component 202. In such cases, the internal microphone 210 may be located inside the vehicle cabin and may be excluded from an external portion of the vehicle. Though FIG. 2 illustrates a single internal microphone 210, in other examples there may be multiple interior microphones configured to receive audio data.

Further, the external microphone 212 may capture sound and send the associated audio data to the impact detection component 202. In such cases, the external microphone 212 may be located along any portion of an exterior surface of the vehicle. Though FIG. 2 illustrates a single external microphone 212, in other examples there may be multiple external microphones configured to receive audio data. As shown, the internal microphone 210 may send first audio data 214 to the volume comparing component 206 and the external microphone 212 may send second audio data 216 to the volume comparing component 206. However, as shown, the internal and external microphones may also send the associated audio data to a learned filtering component 204.

In some examples, the impact detection component 202 may include a learned filtering component 204 configured to identify audio data that corresponds to a vehicle body impact. As shown, in some examples, the learned filtering component 204 may receive the first audio data 214 and/or the second audio data 216. In such cases, the learned filtering component 204 may input such audio data into one or more machine learned models that are trained to identify audio data that corresponds to vehicle collisions. That is, the learned filtering component 204 may input some or all of the audio data sent by the internal microphone 210 and/or the external microphone 212 into a machine learned model. The machine learned model may output an indication as to whether the audio data corresponds to a vehicle collision. In such cases, the learned filtering component 204 may send the audio data that corresponds to a vehicle collision to the volume comparing component 206. As such, the learned filtering component 204 may filter out audio data that does not correspond to vehicle collisions such that the volume comparing component 206 does not perform impact detection techniques on audio data that has been identified as not being associated with a collision. Though the learned filtering component 204 is depicted as being external to the volume comparing component 206 and the sound classifying component 208, in other examples the learned filtering component 204 may be a subcomponent of the volume comparing component 206 and/or the sound classifying component 208.

In some examples, the impact detection component 202 may include a volume comparing component 206 configured to determine the difference between volume levels of internal and external audio data. As shown, the volume comparing component 206 may receive the first audio data 214, the second audio data 216, and/or audio data that has been identified by the learned filtering component 204 as being associated with a collision to the vehicle body. In such cases, the volume comparing component 206 can identify a first volume level of the first audio data 214 and a second volume level of the second audio data. The volume comparing component 206 can determine a difference between the first and second volume levels. In such cases, the volume comparing component 206 can send the difference to the sound classifying component 208.

In some examples, the impact detection component 202 may include a sound classifying component 208 configured to classify sound as an impact or as non-impact. The sound classifying component 208 may receive the first and second audio data and/or the volume difference. In such cases, the sound classifying component 208 can compare the volume difference to a threshold. If the volume difference is below a threshold (e.g., the first and second volume levels are sufficiently similar), the sound classifying component 208 can classify the sound (and/or the audio data) as corresponding to a vehicle body impact. In contrast, if the volume difference meets or exceeds the threshold, the sound classifying component 208 can classify the sound (and/or audio data) as corresponding to a non-impact activity. In some examples, the sound classifying component 208 can send the sound classification(s) to the planning component 218 and/or any other component in the vehicle. In some examples, the planning component 218 can control the vehicle based on the sound classification.

Figure 3:
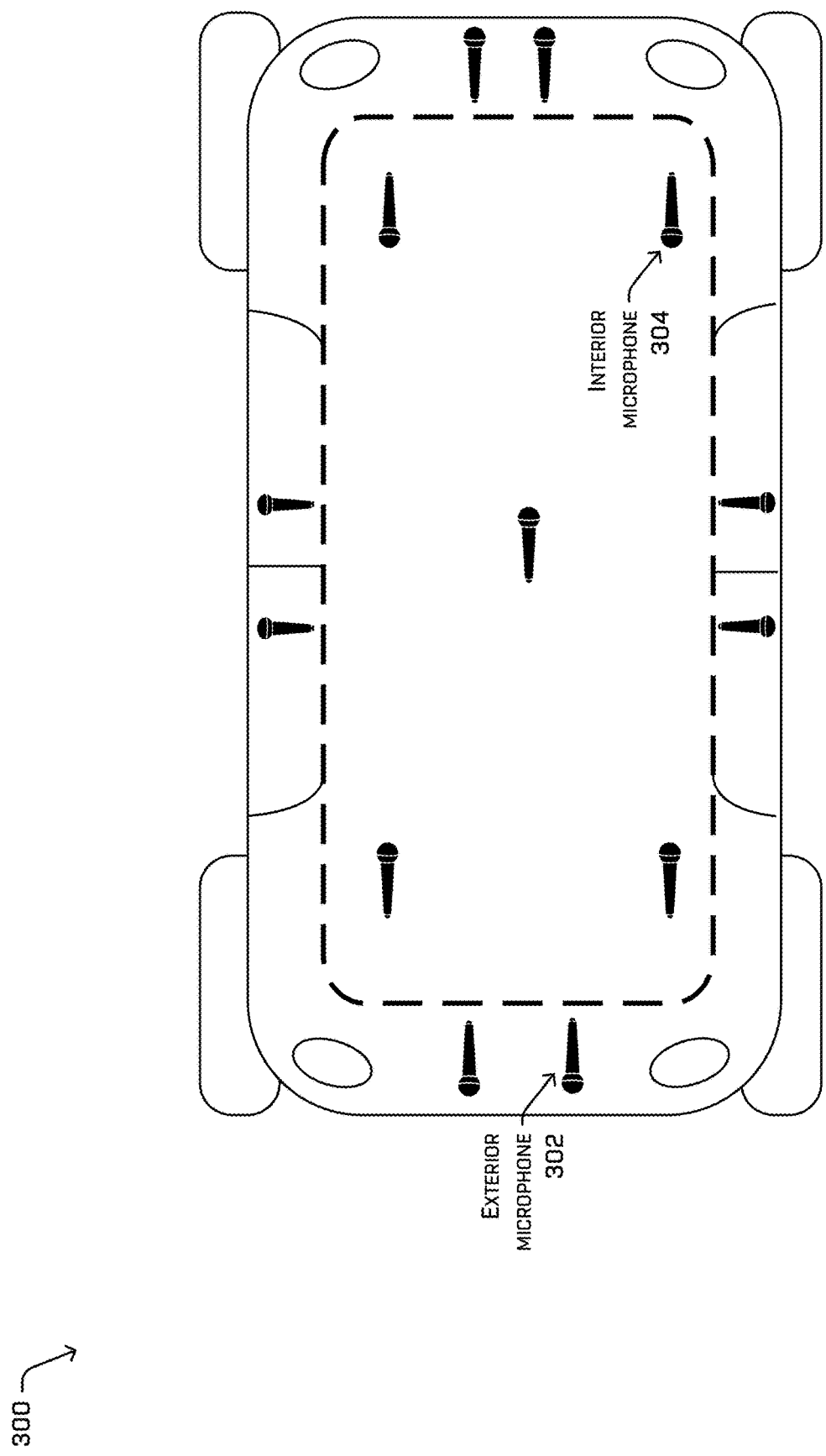
FIG. 3 depicts an example vehicle that includes interior and exterior microphones, in accordance with one or more examples of the disclosure.

FIG. 3 depicts an example vehicle 300 that includes interior and exterior microphones.

In this example, the example vehicle 300 may include one or more microphones located at various positions within and/or on the vehicle. As shown, the example vehicle 300 may include exterior microphone(s) 302 that are located, mounted, and/or installed on an exterior surface of the vehicle body. In such cases, the exterior microphone(s) 302 may be excluded from the interior of the vehicle. As shown, the example vehicle 300 may include eight exterior microphone(s) 302 with two microphones on both ends and sides. However, this is not intended to be limiting; in other examples, the example vehicle 300 may include more or less exterior microphone(s) 302 at the same or different locations on the exterior of the vehicle body.

Further, the example vehicle 300 may include interior microphone(s) 304 that are located, mounted, and/or installed on a surface inside the vehicle cabin. In such cases, the interior microphone(s) 304 may be solely located inside the vehicle cabin which may be sound resistant from sounds occurring in the vicinity of the vehicle. As shown, the example vehicle 300 may include five interior microphone(s) 304 with one on each corner of the vehicle and one in the center of the vehicle. However, this is not intended to be limiting; in other examples, the example vehicle 300 may include more or less interior microphone(s) 304 at the same or different locations within the cabin of the vehicle.

In some examples, some or all of the interior and/or exterior microphones can be arranged in arrays with known spatial relationship. For example, in FIG. 3, one or more of the microphones may represent an array of multiple microphones, or collectively the illustrated microphones may be arranged in an array. As such, the microphones can be used to determine accurate direction of received sounds using triangulation and/or phase differences of received sounds.

As describe above, the exterior microphone(s) 302 and the interior microphone(s) 304 may be designed to capture audio data of sounds occurring proximate the microphone. In such cases, the microphone(s) may send the audio data to the impact detection component to determine whether there has been a vehicle body impact.

Figure 4:
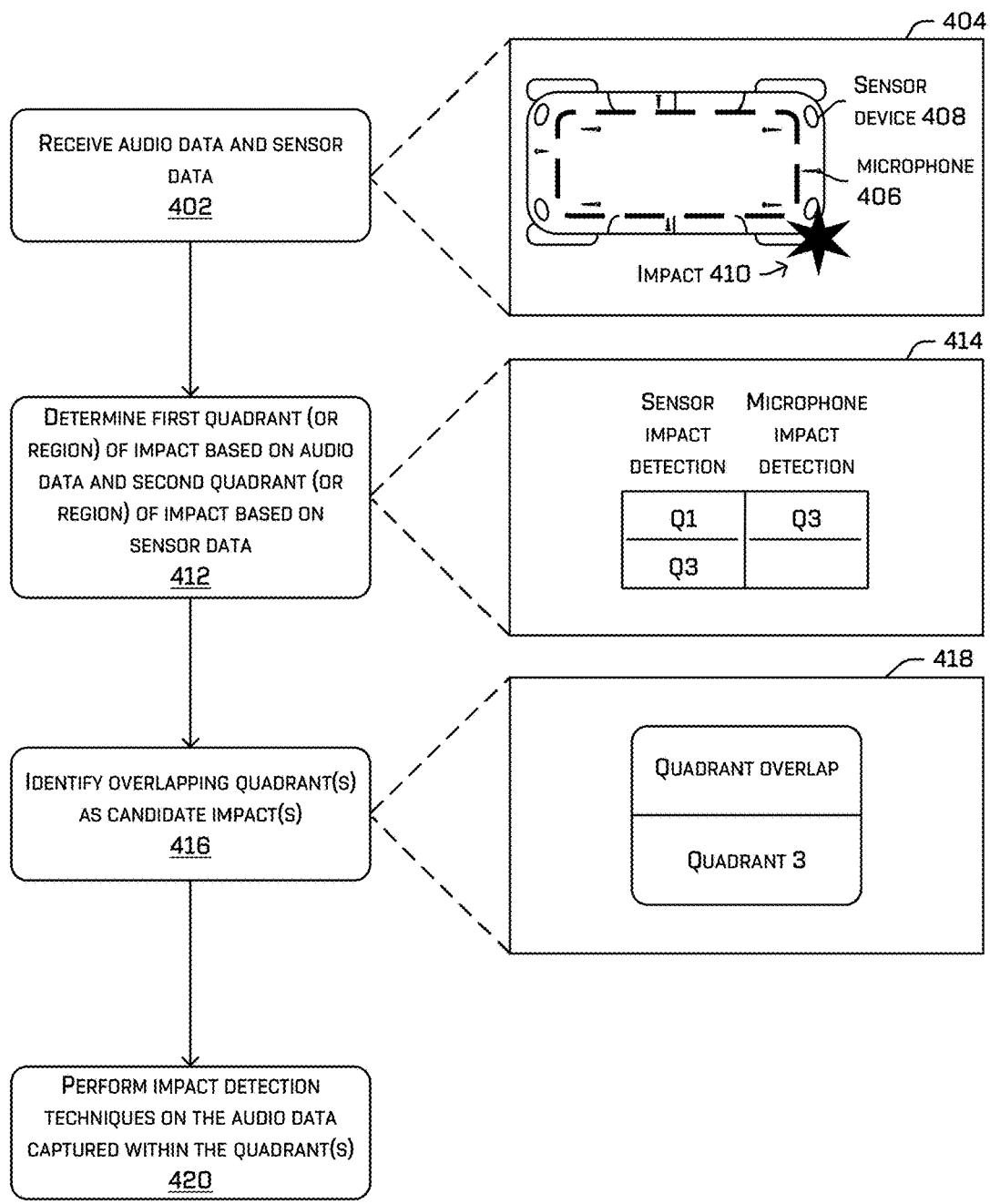
FIG. 4 is a pictorial flow diagram illustrating an example technique for using multiple sensor modalities to detect potential impact sound(s), in accordance with one or more examples of the disclosure.

FIG. 4 is a pictorial flow diagram illustrating an example process 400 for using multiple sensor modalities to detect potential impact sound(s). In some examples, the operations described in FIG. 4 may be performed by the impact detection component 202 as described above.

At operation 402, the impact detection component may receive audio data and sensor data. In some examples, the impact detection component may receive sensor data from one or more types of sensor devices to detect impact(s) to the vehicle body. For example, box 404 illustrates multiple sensor modalities on a vehicle. In this example, box 404 may include a vehicle with a microphone 406 that is designed to capture audio data associated with a sound within and/or around the vehicle. Further, the vehicle may include a sensor device 408 which may be a radar device, lidar device, image capturing device, and/or any other type of sensor device. In such examples, the sensor device 408 may capture sensor data associated with the impact 410. Further, the microphone 406 may capture audio data associated with the impact 410.

At operation 412, the impact detection component may determine a first quadrant (or region) of impact based on the audio data and a second quadrant (or region) of impact based on the sensor data. That is, in some example, the impact detection component may use one or more machine learned models to determine whether the audio data captured at operation 402 corresponds to an impact and if so, which quadrant or region (e.g., front, middle, back, side, left, right, top, bottom, etc.) of the vehicle the impact is associated with. In some examples, the vehicle may be discretized into four quadrants. As such, the impact detection component may determine within which quadrant the impact occurred. Examples of detecting impacts can be found, for example, in U.S. Pat. No. 11,851,049, filed on Feb. 28, 2020, issued on Dec. 26, 2023, and titled, "System to Detect Impacts," which is incorporated by reference herein in its entirety and for all purposes.

For example, box 414 illustrates a table indicating which quadrant(s) the machine learned models detected an impact. In this example, the impact detection component detected, based on the audio data, an impact in the third quadrant. Further, the impact detection component detected, based on the sensor data, an impact in the first and third quadrants.

At operation 416, the impact detection component may identify overlapping quadrant(s) as potential impact(s). That is, the impact detection component may determine that a quadrant contains a potential impact if there is an overlap in detections between the sensor data and the audio data. For example, box 418 illustrates a table that indicates whether there is an overlap in quadrants. In this example, box 418 indicates that both the sensor data and the audio data include an impact in the third quadrant. As such, the impact detection component may tag or indicate that the sensor data associated with the impact in the first quadrant as a false-positive impact detection while indicating that the sensor data and audio data in the third quadrant is associated with a potential impact.

At operation 420, the impact detection component may perform impact detection techniques on the audio data captured within the quadrant(s). That is, the impact detection component may identify the microphones and/or audio data located within the third quadrant and perform the impact detection operations as described in FIG. 1.

Figure 5:
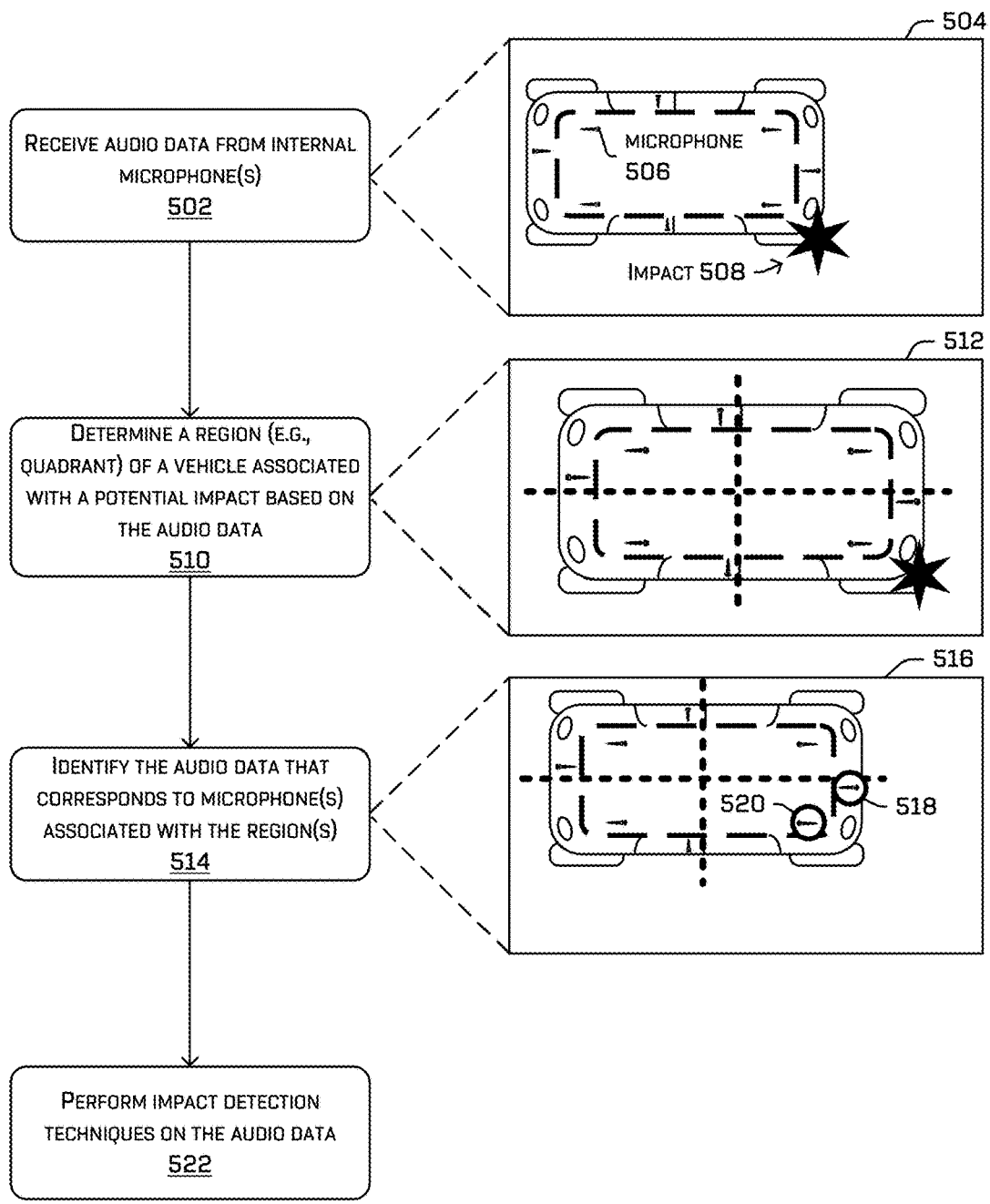
FIG. 5 is a pictorial flow diagram illustrating an example technique for detecting a quadrant of a potential impact and using the microphones within the quadrant to evaluate the potential impact, in accordance with one or more examples of the disclosure.

FIG. 5 is a pictorial flow diagram illustrating an example process 500 for detecting a quadrant of a potential impact and using the microphones within the quadrant to evaluate the potential impact. In some examples, the operations described in FIG. 5 may be performed by the impact detection component 202 as described above.

At operation 502, the impact detection component may receive audio data from internal microphones. As described above, the vehicle may include one or more microphones located inside the vehicle cabin. For example, box 504 illustrates internal microphones of a vehicle capturing audio data. In this example, the vehicle may include internal microphone(s) 506. The internal microphone(s) 506 may be designed to capture audio data associated with sound of an impact 508.

At operation 510, the impact detection component may determine a region (e.g., quadrant) of a vehicle associated with a potential impact based on the audio data received at operation 502. That is, the vehicle may be discretized into four quadrants that include one or more microphones. In this example, the impact detection component may use a machine learned model to determine if the audio data corresponds to an impact and if so, which quadrant the impact corresponds to. For example, box 512 illustrates the vehicle discretized into four distinct quadrants. In this example, the impact detection component may determine that the audio data corresponds to an impact within the bottom right quadrant of the vehicle.

At operation 514, the impact detection component may identify the audio data that corresponds to microphone(s) associated with the region (or quadrant). As indicated above, the quadrant or region may include one or more microphones (internal and/or external). In such examples, the impact detection component may identify the microphones in the region and retrieve the audio data associated thereto. For example, box 516 illustrates microphones that are located in the bottom right quadrant. In this example, the microphone 518 and the microphone 520 are located within the bottom right region. In this example, the microphone 518 may be located external to the vehicle while the microphone 520 is located inside the vehicle. As such, the impact detection component may retrieve the audio data associated with such microphones.

Alternatively or additionally, the impact detection component may identify and/or receive audio data from one or more internal and/or external microphones from one or more adjacent regions or quadrants. For example, the impact detection component may identify some (e.g., subset) or all microphones in the regions that are adjacent to the region that included the potential impact. In some cases, the impact detection component may retrieve the audio data from all of the microphones in the adjacent regions, from a threshold number of the microphones in the adjacent regions, from the microphones within a threshold distance from the potential impact, from the microphones within a threshold distance from the region that includes the impact, etc.

At operation 522, the impact detection component may perform impact detection techniques on the audio data from the microphone 518 and the microphone 520. That is, the impact detection component may perform the impact detection operations as described in FIG. 1 on the audio data within the bottom right region. Such operations reduce the amount of audio data on which to perform the impact detection operations.

Figure 6:
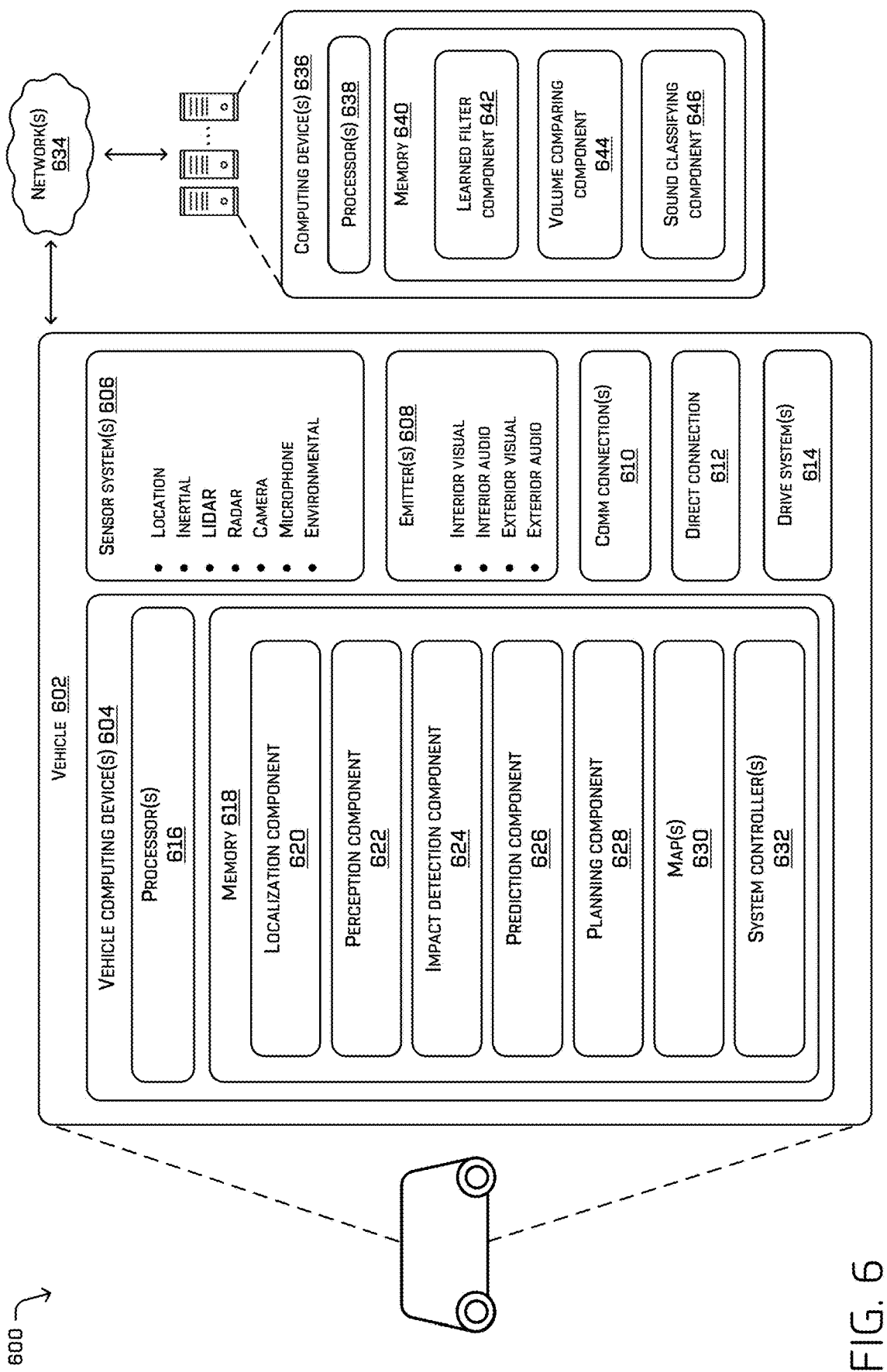
FIG. 6 depicts a block diagram of an example system for implementing various techniques described herein.

FIG. 6 is a block diagram of an example system 600 for implementing the techniques described herein. In at least one example, the system 600 may include a vehicle, such as vehicle 602. The vehicle 602 may include one or more vehicle computing devices 604, one or more sensor systems 606, one or more emitters 608, one or more communication connections 610, at least one direct connection 612, and one or more drive systems 614.

The vehicle computing device 604 may include one or more processors 616 and memory 618 communicatively coupled with the processor(s) 616. In the illustrated example, the vehicle 602 is an autonomous vehicle; however, the vehicle 602 could be any other type of vehicle, such as a semi-autonomous vehicle, or any other system having at least an image capture device (e.g., a camera-enabled smartphone). In some instances, the autonomous vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 602 may be a fully or partially autonomous vehicle having any other level or classification.

In the illustrated example, the memory 618 of the vehicle computing device 604 stores a localization component 620, a perception component 622, an impact detection component 624, a prediction component 626, a planner component 628, one or more system controllers 632, and one or more maps 630 (or map data). Though depicted in FIG. 6 as residing in the memory 618 for illustrative purposes, it is contemplated that the localization component 620, the perception component 622, the impact detection component 624, the prediction component 626, the planner component 628, system controller(s) 632, and/or the map(s) may additionally, or alternatively, be accessible to the vehicle 602 (e.g., stored on, or otherwise accessible by, memory remote from the vehicle 602, such as, for example, on memory 640 of one or more computing device 636 (e.g., a remote computing device)). In some examples, the memory 640 may include a learned filter component 642, a volume comparing component 644, and/or a sound classifying component 646.

In at least one example, the localization component 620 may include functionality to receive sensor data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment, such as from map(s) 630, and may continuously determine a location and/or orientation of the vehicle 602 within the environment. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 602. In some instances, the localization component 620 may provide data to various components of the vehicle 602 to determine an initial position of the vehicle 602 for determining the relevance of an object to the vehicle 602, as discussed herein.

In some instances, the perception component 622 may include functionality to perform object detection, segmentation, and/or classification. In some examples, the perception component 622 may provide processed sensor data that indicates a presence of an object (e.g., entity) that is proximate to the vehicle 602 and/or a classification of the object as an object type (e.g., car, pedestrian, cyclist, animal, building, tree, road surface, curb, sidewalk, unknown, etc.). In some examples, the perception component 622 may provide processed sensor data that indicates a presence of a stationary entity that is proximate to the vehicle 602 and/or a classification of the stationary entity as a type (e.g., building, tree, road surface, curb, sidewalk, unknown, etc.). In additional or alternative examples, the perception component 622 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 626 may generate one or more probability maps representing prediction probabilities of possible locations of one or more objects in an environment. For example, the prediction component 626 may generate one or more probability maps for vehicles, pedestrians, animals, and the like within a threshold distance from the vehicle 602. In some instances, the prediction component 626 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 626 may generate predicted trajectories of objects (e.g., objects) in an environment. For example, the prediction component 626 may generate one or more predicted trajectories for objects within a threshold distance from the vehicle 602. In some examples, the prediction component 626 may measure a trace of an object and generate a trajectory for the object based on observed and predicted behavior. Additionally, the prediction component 626 may be perform any of the techniques described with respect to any of FIGS. 1-6 above with respect to receiving, retrieving, determining, and/or generating predicted trajectories for object(s) within the environment.

In general, the planner component 628 may determine a path for the vehicle 602 to follow to traverse through an environment. For example, the planner component 628 may determine various routes and trajectories and various levels of detail. For example, the planner component 628 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 628 may generate an instruction for guiding the vehicle 602 along at least a portion of the route from the first location to the second location. In at least one example, the planner component 628 may determine how to guide the vehicle 602 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 628 may select a trajectory for the vehicle 602.

In other examples, the planner component 628 may alternatively, or additionally, use data from the localization component 620, the perception component 622, and/or the prediction component 626 to determine a path for the vehicle 602 to follow to traverse through an environment. For example, the planner component 628 may receive data (e.g., object data) from the localization component 620, the perception component 622, and/or the prediction component 626 regarding objects associated with an environment. In some examples, the planner component 628 receives data for relevant objects within the environment. Using this data, the planner component 628 may determine a route to travel from a first location (e.g., a current location) to a second location (e.g., a target location) to avoid objects in an environment. In at least some examples, such a planner component 628 may determine there is no such collision-free path and, in turn, provide a path that brings vehicle 602 to a safe stop avoiding all collisions and/or otherwise mitigating damage.

The impact detection component 624 may perform any of the techniques described with respect to any of FIGS. 1-5 above with respect to detecting impacts using internal microphones.

In at least one example, the vehicle computing device 604 may include one or more system controllers 632, which may be configured to control steering, propulsion, braking, safety, emitters, communication, and other systems of the vehicle 602. The system controller(s) 632 may communicate with and/or control corresponding systems of the drive system(s) 614 and/or other components of the vehicle 602.

The memory 618 may further include one or more maps 630 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the map(s) 630. That is, the map(s) 630 may be used in connection with the localization component 620, the perception component 622, the prediction component 626, and/or the planner component 628 to determine a location of the vehicle 602, detect objects in an environment, generate routes, determine actions and/or trajectories to navigate within an environment.

In some examples, the one or more maps 630 may be stored on a remote computing device(s) (such as the computing device(s) 636) accessible via network(s) 634. In some examples, multiple maps 630 may be stored based on, for example, a characteristic (e.g., type of entity, time of day, day of week, season of the year, etc.). Storing multiple maps 630 may have similar memory requirements, but increase the speed at which data in a map may be accessed.

In some instances, aspects of some or all of the components discussed herein may include any models, techniques, and/or machine-learned techniques. For example, in some instances, the components in the memory 618 (and the memory 640, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNext, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device 604. Additionally, or in the alternative, the sensor system(s) 606 may send sensor data, via the one or more networks 634, to the one or more computing device(s) 636 at a particular frequency, after a lapse of a predetermined period of time, in near real-time, etc.

The vehicle 602 may also include one or more emitters 608 for emitting light and/or sound. The emitter(s) 608 may include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 may also include one or more communication connections 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., computing device 636, other nearby vehicles, etc.) and/or one or more remote sensor system(s) for receiving sensor data. The communications connection(s) 610 also enable the vehicle 602 to communicate with a remote teleoperations computing device or other remote services.

The communications connection(s) 610 may include physical and/or logical interfaces for connecting the vehicle computing device 604 to another computing device or a network, such as network(s) 634. For example, the communications connection(s) 610 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive module with one or more other local or remote computing device(s).

In at least one example, the direct connection 612 may provide a physical interface to couple the one or more drive system(s) 614 with the body of the vehicle 602. For example, the direct connection 612 may allow the transfer of energy, fluids, air, data, etc. between the drive system(s) 614 and the vehicle. In some instances, the direct connection 612 may further releasably secure the drive system(s) 614 to the body of the vehicle 602.

In at least one example, the localization component 620, the perception component 622, the impact detection component 624, the prediction component 626, the planner component 628, the one or more system controllers 632, and the one or more maps 630 may process sensor data, as described above, and may send their respective outputs, over the one or more network(s) 634, to the computing device(s) 636. In at least one example, the localization component 620, the perception component 622, the impact detection component 624, the prediction component 626, the planner component 628, the one or more system controllers 632, and the one or more maps 630 may send their respective outputs to the computing device(s) 636 at a particular frequency, after a lapse of a predetermined period of time, in near real-time, etc.

In some examples, the vehicle 602 may send sensor data to the computing device(s) 636 via the network(s) 634. In some examples, the vehicle 602 may receive sensor data from the computing device(s) 636 and/or remote sensor system(s) via the network(s) 634. The sensor data may include raw sensor data and/or processed sensor data and/or representations of sensor data. In some examples, the sensor data (raw or processed) may be sent and/or received as one or more log files.

The computing device(s) 636 may include processor(s) 638 and a memory 640, which may include a learned filter component 642, a volume comparing component 644, and/or a sound classifying component 646. In some examples, the memory 640 may store one or more of components that are similar to the component(s) stored in the memory 618 of the vehicle 602. In such examples, the computing device(s) 636 may be configured to perform one or more of the processes described herein with respect to the vehicle 602. In some examples, the learned filter component 642, the volume comparing component 644, and/or the sound classifying component 646 may perform substantially similar functions as the impact detection component 624.

The processor(s) 616 of the vehicle 602 and the processor(s) 638 of the computing device(s) 636 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and memory 640 are examples of non-transitory computer-readable media. The memory 618 and memory 640 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 6 is illustrated as a distributed system, in alternative examples, components of the vehicle 602 may be associated with the computing device(s) 636 and/or components of the computing device(s) 636 may be associated with the vehicle 602. That is, the vehicle 602 may perform one or more of the functions associated with the computing device(s) 636, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 7:
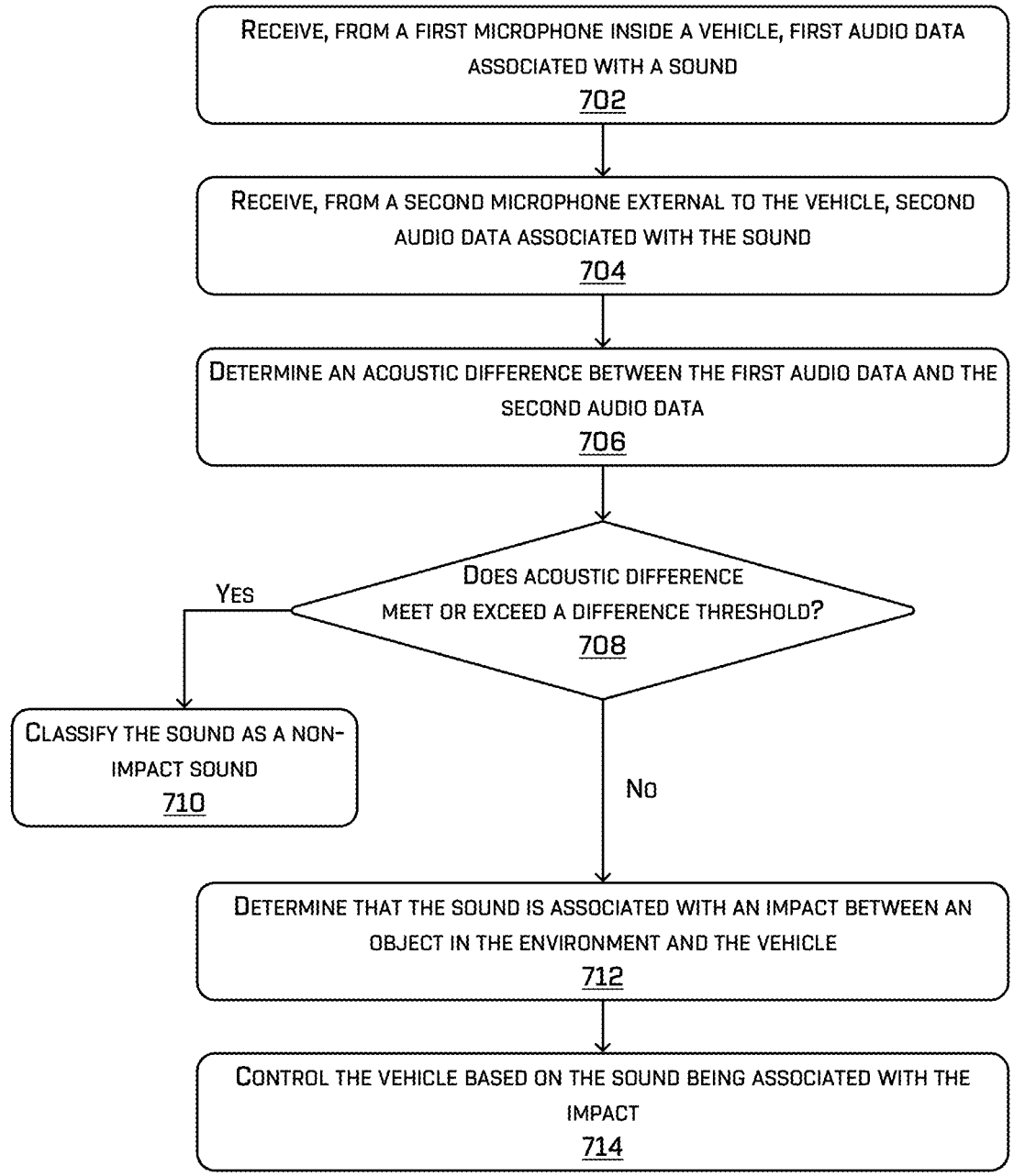
FIG. 7 is a flow diagram illustrating an example process for receiving audio data, determining whether such audio data is associated with a vehicle impact, and controlling the vehicle based on the vehicle impact, in accordance with one or more examples of the disclosure.

FIG. 7 is a flow diagram illustrating an example process 700 for receiving audio data, determining whether such audio data is associated with a vehicle impact, and controlling the vehicle based on the vehicle impact. As described below, the example process 700 may be performed by one or more computer-based components configured to implement various functionalities described herein. For instance, process 700 may be performed by an impact detection component 202. As described above, the impact detection component 202 may be integrated as an on-vehicle system in some examples. However, in other examples, the impact detection component 202 may be integrated as a separate server-based system.

Process 700 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 702, the impact detection component may receive, from a first microphone inside a vehicle, first audio data associated with a sound. That is, one or more microphones located inside the vehicle cabin may receive first audio data associated with a sound. In some examples, the vehicle may include a cabin that defines an interior region of the vehicle. The cabin may include one or more seats upon which one or more passengers may sit while the vehicle navigates the environment. In some examples, the cabin may be sealed from the environment external to the vehicle such as to form a soundproof (or sound resistant) cabin. That is, the sound(s) that occur external to the vehicle cabin (or in the vicinity of the vehicle) may be suppressed and/or blocked by the vehicle body such that the sound(s) are not heard inside the vehicle cabin.

In some examples, the cabin may include one or more microphones (otherwise known as interior microphones) located, mounted, and/or installed at various positions within the vehicle cabin. That is, the microphone(s) may be located or otherwise positioned along the sides, edges, roof, and/or floor portion of the cabin. Such microphones may be designed to capture audio that is proximate the microphone. As such, based on the occurrence of a sound, the impact detection component may receive associated audio data from some or all of the interior microphones.

At operation 704, the impact detection component may receive, from a second microphone external to the vehicle, second audio data associated with the sound. That is, the vehicle may include one or more microphones located along an exterior surface of the vehicle body. The external microphone(s) may be located, mounted, and/or installed at various positions (e.g., side, end, top, bottom, etc.) along the external surface of the vehicle body. In some examples, the external microphones may be designed to receive audio associated with sound that is external to the vehicle cabin. Accordingly, based on the occurrence of the sound, the impact detection component may receive associated audio data from some or all of the exterior microphones.

At operation 706, the impact detection component may determine a volume difference between a first volume of the first audio data and a second volume of the second audio data. As indicated above, the audio data may include a volume parameter that indicates a level of volume associated with the audio data. As such, the impact detection component may determine a first volume level of the first audio data, a second volume level of the second audio data, compare the first volume level to the second volume level, and determine a difference between the two volume levels.

At operation 708, the impact detection component may determine whether the volume difference meets or exceeds a difference threshold. Based on the soundproof cabin, sound(s) that don't correspond to physical contact to the vehicle body are not likely to be captured by the interior microphones. In contrast, sounds that correspond to physical contact to the vehicle body may propagate through the vehicle body and are likely to be captured by the interior microphones as well as the external microphones. In the case of an impact to the vehicle body, the interior and exterior microphones may capture audio data at a similar volume level. In the case of a non-impact sound proximate the vehicle, the interior microphone(s) may capture the sound at a lower volume level compared to the exterior microphones due to the sound failing to travel through the vehicle body. As such, if the difference between the volume levels meets or exceeds a threshold level (708: Yes), the impact detection component may classify the sound as corresponding to a non-impact sound. That is, at operation 710, the impact detection component may classify the sound as a non-impact sound and control the vehicle accordingly.

In contrast, if the difference between the volume levels is below a threshold level (708: No), the impact detection component may classify the sound as corresponding to an impact to the vehicle body. That is, at operation 712, the impact detection component may determine that the sound is associated with an impact between an object in the environment and the vehicle.

At operation 714, the impact detection component may control the vehicle based on the sound being associated with the impact. That is, upon detecting a sound that is indicative of an impact to the vehicle, the vehicle can perform one or more operations. Such operations may include sending a request to a remote operation system (e.g., send sensor data (e.g., radar data, lidar data, image data, audio data, etc.) to a remote operation system (or remote operator)), stop the vehicle (e.g., reduce the velocity of the vehicle below a threshold amount), record data (e.g., video data, audio data, etc.) associated with the impact (e.g., store features of the data that correspond to the impact), recalibrate some or all systems within the vehicle, etc.

EXAMPLE CLAUSES

A: A system comprising: one or more processors; and one or more non-transitory computer-readable media storing computer-executable instructions that, when executed, cause the system to perform operations comprising: receiving, from a first microphone located inside a vehicle, first audio data associated with a sound; receiving, from a second microphone located on an external surface of the vehicle, second audio data associated with the sound; determining a volume difference between a first volume of the first audio data and a second volume of the second audio data; determining that the volume difference is below a threshold level of difference; determining, based at least in part on the volume difference being below the threshold level of difference, that the sound is associated with an impact between an object in an environment and the vehicle; controlling the vehicle based at least in part on the sound being associated with the impact.

B: The system of paragraph A, wherein the operations comprise: inputting the first audio data and the second audio data into a machine learned model; and receiving, from the machine learned model, an indication that the first audio data and the second audio data are associated with the impact.

C: The system of paragraph A, wherein determining the volume difference is based at least in part on: receiving, from a sensor device, sensor data of the environment; determining, based at least in part on the first audio data or the second audio data, a first quadrant of the vehicle that is associated with the sound; determining, based at least in part on the sensor data, a second quadrant of the vehicle that is associated with the sound; and determining that the first quadrant and the second quadrant are a same quadrant, wherein determining the volume difference is based at least in part on the first quadrant and the second quadrant being the same quadrant.

D: The system of paragraph A, wherein determining that the sound is associated with the impact is further based at least in part on: determining a volume level of the first audio data; receiving a volume threshold; and determining, based at least in part on the volume level meeting or exceeding the volume threshold, that the sound is associated with the impact.

E: The system of paragraph A, wherein controlling the vehicle comprises at least in part on at least one of: modifying a velocity of the vehicle, causing a request to be sent to a remote operation system, or causing a portion of the first audio data or the second audio data to be recorded.

F: One or more non-transitory computer-readable media storing instructions executable by one or more processors, wherein the instructions, when executed, cause a system to perform operations comprising: receiving, from a first microphone located inside a vehicle, first audio data; receiving, from a second microphone, second audio data; determining an attribute associated with the first audio data and the second audio data; and determining, based at least in part on the attribute, that sound associated with the first audio data and the second audio data is associated with an impact between an object in an environment and the vehicle.

G: The one or more non-transitory computer-readable media of paragraph F wherein the operations further comprise: inputting the first audio data or the second audio data into a machine learned model; receiving, from the machine learned model, an indication that the first audio data or the second audio data is associated with the impact.

H: The one or more non-transitory computer-readable media of paragraph F, wherein determining the attribute is based at least in part on: receiving, from a sensor device, sensor data of the environment; determining, based at least in part on the first audio data or the second audio data, a first region of the vehicle that is associated with the sound; determining, based at least in part on the sensor data, a second region of the vehicle that is associated with the sound; and determining that the first region and the second region are a same region, wherein determining the attribute is based at least in part on the first region and the second region being the same region.

I: The one or more non-transitory computer-readable media of paragraph F, wherein determining that the sound is associated with the impact is further based at least in part on: determining a volume level of the first audio data; receiving a volume threshold; and determining, based at least in part on the volume level meeting or exceeding the volume threshold, that the sound is associated with the impact.

J: The one or more non-transitory computer-readable media of paragraph F, wherein controlling the vehicle comprises at least in part on at least one of: modifying a velocity of the vehicle, causing a request to be sent to a remote operation system, or causing a portion of the first audio data or the second audio data to be recorded.

K: The one or more non-transitory computer-readable media of paragraph F, the operations further comprising: inputting the second audio data into a machine learned model; receiving, from the machine learned model, an indication that the sound is associated with a region of the vehicle; identifying, in response to the indication that the sound is associated with the region, the first microphone located associated with the region of the vehicle; retrieving, from the first microphone, the first audio data; and detecting the impact in the first audio data.

L: The one or more non-transitory computer-readable media of paragraph F, wherein the attribute is at least one or more of: a difference or ratio in volume between the first audio data and the second audio data, a difference or ratio in frequency between the first audio data and the second audio data, a difference or ratio in time between the first audio data and the second audio data, or a difference or ratio in loudness between the first audio data and the second audio data.

M: The one or more non-transitory computer-readable media of paragraph F, the operations further comprising: controlling the vehicle based at least in part on the sound being associated with the impact.

N: A method comprising: receiving, from a first microphone located inside a vehicle, first audio data; receiving, from a second microphone, second audio data; determining an attribute associated with the first audio data and the second audio data; and determining, based at least in part on the attribute, that sound associated with the first audio data and the second audio data is associated with an impact between an object in an environment and the vehicle.

O: The method of paragraph N, further comprising: inputting the first audio data or the second audio data into a machine learned model; receiving, from the machine learned model, an indication that the first audio data or the second audio data is associated with the impact.

P: The method of paragraph N, wherein determining the attribute is based at least in part on: receiving, from a sensor device, sensor data of the environment; determining, based at least in part on the first audio data or the second audio data, a first region of the vehicle that is associated with the sound; determining, based at least in part on the sensor data, a second region of the vehicle that is associated with the sound; and determining that the first region and the second region are a same region, wherein determining the attribute is based at least in part on the first region and the second region being the same region.

Q: The method of paragraph N, wherein determining that the sound is associated with the impact is further based at least in part on: determining a volume level of the first audio data; receiving a volume threshold; and determining, based at least in part on the volume level meeting or exceeding the volume threshold, that the sound is associated with the impact.

R: The method of paragraph N, wherein controlling the vehicle comprises at least in part on at least one of: modifying a velocity of the vehicle, causing a request to be sent to a remote operation system, or causing a portion of the first audio data or the second audio data to be recorded.

S: The method of paragraph N, further comprising: inputting the second audio data into a machine learned model; receiving, from the machine learned model, an indication that the sound is associated with a region of the vehicle; identifying, in response to the indication that the sound is associated with the region, the first microphone located associated with the region of the vehicle; retrieving, from the first microphone, the first audio data; and detecting the impact in the first audio data.

T: The method of paragraph N, wherein the attribute is at least one or more of: a difference or ratio in volume between the first audio data and the second audio data, a difference or ratio in frequency between the first audio data and the second audio data, a difference or ratio in time between the first audio data and the second audio data, or a difference or ratio in loudness between the first audio data and the second audio data.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more non-transitory computer-readable media storing computer-executable instructions that, when executed, cause the system to perform operations comprising:
      receiving, from a first microphone located inside a vehicle, first audio data associated with a sound;
      receiving, from a second microphone located on an external surface of the vehicle, second audio data associated with the sound;
      determining a volume difference between a first volume of the first audio data and a second volume of the second audio data;
      determining that the volume difference is below a threshold level of difference;
      determining, based at least in part on the volume difference being below the threshold level of difference, that the sound is associated with an impact between an object in an environment and the vehicle;
      controlling the vehicle based at least in part on the sound being associated with the impact.

2. The system of claim 1, wherein the operations comprise:
   inputting the first audio data and the second audio data into a machine learned model; and
   receiving, from the machine learned model, an indication that the first audio data and the second audio data are associated with the impact.

3. The system of claim 1, wherein determining the volume difference is based at least in part on:
   receiving, from a sensor device, sensor data of the environment;
   determining, based at least in part on the first audio data or the second audio data, a first quadrant of the vehicle that is associated with the sound;
   determining, based at least in part on the sensor data, a second quadrant of the vehicle that is associated with the sound; and
   determining that the first quadrant and the second quadrant are a same quadrant,
   wherein determining the volume difference is based at least in part on the first quadrant and the second quadrant being the same quadrant.

4. The system of claim 1, wherein determining that the sound is associated with the impact is further based at least in part on:
   determining a volume level of the first audio data;
   receiving a volume threshold; and
   determining, based at least in part on the volume level meeting or exceeding the volume threshold, that the sound is associated with the impact.

5. The system of claim 1, wherein controlling the vehicle comprises at least in part on at least one of:
   modifying a velocity of the vehicle,
   causing a request to be sent to a remote operation system, or causing a portion of the first audio data or the second audio data to be recorded.

6. One or more non-transitory computer-readable media storing instructions executable by one or more processors, wherein the instructions, when executed, cause a system to perform operations comprising:
   receiving, from a first microphone located inside a vehicle, first audio data;
   receiving, from a second microphone, second audio data;
   determining an attribute associated with the first audio data and the second audio data; and
   determining, based at least in part on the attribute, that sound associated with the first audio data and the second audio data is associated with an impact between an object in an environment and the vehicle.

7. The one or more non-transitory computer-readable media of claim 6 wherein the operations further comprise:
   inputting the first audio data or the second audio data into a machine learned model;
   receiving, from the machine learned model, an indication that the first audio data or the second audio data is associated with the impact.

8. The one or more non-transitory computer-readable media of claim 6, wherein determining the attribute is based at least in part on:
   receiving, from a sensor device, sensor data of the environment;
   determining, based at least in part on the first audio data or the second audio data, a first region of the vehicle that is associated with the sound;
   determining, based at least in part on the sensor data, a second region of the vehicle that is associated with the sound; and
   determining that the first region and the second region are a same region,
   wherein determining the attribute is based at least in part on the first region and the second region being the same region.

9. The one or more non-transitory computer-readable media of claim 6, wherein determining that the sound is associated with the impact is further based at least in part on:
   determining a volume level of the first audio data;
   receiving a volume threshold; and
   determining, based at least in part on the volume level meeting or exceeding the volume threshold, that the sound is associated with the impact.

10. The one or more non-transitory computer-readable media of claim 6, wherein controlling the vehicle comprises at least in part on at least one of:
    modifying a velocity of the vehicle,
    causing a request to be sent to a remote operation system, or causing a portion of the first audio data or the second audio data to be recorded.

11. The one or more non-transitory computer-readable media of claim 6, the operations further comprising:
    inputting the second audio data into a machine learned model;

receiving, from the machine learned model, an indication that the sound is associated with a region of the vehicle;

identifying, in response to the indication that the sound is associated with the region, the first microphone located associated with the region of the vehicle;

retrieving, from the first microphone, the first audio data; and detecting the impact in the first audio data.

12. The one or more non-transitory computer-readable media of claim 6, wherein the attribute is at least one or more of:
   a difference or ratio in volume between the first audio data and the second audio data,
   a difference or ratio in frequency between the first audio data and the second audio data,
   a difference or ratio in time between the first audio data and the second audio data, or
   a difference or ratio in loudness between the first audio data and the second audio data.

13. The one or more non-transitory computer-readable media of claim 6, the operations further comprising:
   controlling the vehicle based at least in part on the sound being associated with the impact.

14. A method comprising:
   receiving, from a first microphone located inside a vehicle, first audio data;
   receiving, from a second microphone, second audio data;
   determining an attribute associated with the first audio data and the second audio data; and
   determining, based at least in part on the attribute, that sound associated with the first audio data and the second audio data is associated with an impact between an object in an environment and the vehicle.

15. The method of claim 14, further comprising:
   inputting the first audio data or the second audio data into a machine learned model;
   receiving, from the machine learned model, an indication that the first audio data or the second audio data is associated with the impact.

16. The method of claim 14, wherein determining the attribute is based at least in part on:
   receiving, from a sensor device, sensor data of the environment;
   determining, based at least in part on the first audio data or the second audio data, a first region of the vehicle that is associated with the sound;
   determining, based at least in part on the sensor data, a second region of the vehicle that is associated with the sound; and
   determining that the first region and the second region are a same region, wherein determining the attribute is based at least in part on the first region and the second region being the same region.

17. The method of claim 14, wherein determining that the sound is associated with the impact is further based at least in part on:
   determining a volume level of the first audio data;
   receiving a volume threshold; and
   determining, based at least in part on the volume level meeting or exceeding the volume threshold, that the sound is associated with the impact.

18. The method of claim 14, wherein controlling the vehicle comprises at least in part on at least one of:
   modifying a velocity of the vehicle,
   causing a request to be sent to a remote operation system, or
   causing a portion of the first audio data or the second audio data to be recorded.

19. The method of claim 14, further comprising:
   inputting the second audio data into a machine learned model;
   receiving, from the machine learned model, an indication that the sound is associated with a region of the vehicle;
   identifying, in response to the indication that the sound is associated with the region, the first microphone located associated with the region of the vehicle;
   retrieving, from the first microphone, the first audio data; and
   detecting the impact in the first audio data.

20. The method of claim 14, wherein the attribute is at least one or more of:
   a difference or ratio in volume between the first audio data and the second audio data,
   a difference or ratio in frequency between the first audio data and the second audio data,
   a difference or ratio in time between the first audio data and the second audio data, or
   a difference or ratio in loudness between the first audio data and the second audio data.

* * * * *